(12) United States Patent
Benson (10) Patent No.: US 7,607,867 B2
(45) Date of Patent: Oct. 27, 2009

(54) TOOLING INSERT WITH MATING SURFACE

(75) Inventor: Lloyd Ray Benson, Pearland, TX (US)

(73) Assignee: Sandvik Intellectual Property AB, Sandviken (SE)

( * ) Notice: Subject to any disclaimer, the term of this patent is extended or adjusted under 35 U.S.C. 154(b) by 85 days.

(21) Appl. No.: 11/639,151

(22) Filed: Dec. 15, 2006

(65) Prior Publication Data

US 2008/0145159 A1 Jun. 19, 2008

(51) Int. Cl.
*B23B 27/16* (2006.01)

(52) U.S. Cl. .................. 407/102; 407/66; 407/113; 407/101

(58) Field of Classification Search .................. 407/47, 407/48, 66, 101–103, 113
See application file for complete search history.

(56) References Cited

U.S. PATENT DOCUMENTS

| | | | | |
|---|---|---|---|---|
| 349,475 | A * | 9/1886 | Barclay | 407/64 |
| 2,240,360 | A | 4/1941 | Whitman | |
| 4,545,705 | A | 10/1985 | Benson | |
| 4,709,737 | A * | 12/1987 | Jonsson | 144/241 |
| 4,749,667 | A | 6/1988 | Jun et al. | |
| 5,236,288 | A * | 8/1993 | Flueckiger | 407/36 |
| 5,525,016 | A | 6/1996 | Paya et al. | |
| 5,810,518 | A | 9/1998 | Wiman et al. | |
| 5,924,826 | A * | 7/1999 | Bystrom et al. | 407/103 |
| 5,931,613 | A * | 8/1999 | Larsson | 407/103 |
| 6,146,060 | A * | 11/2000 | Rydberg et al. | 407/40 |
| 6,146,061 | A * | 11/2000 | Larsson | 407/103 |
| 6,524,034 | B2 | 2/2003 | Eng et al. | |
| 6,626,614 | B2 | 9/2003 | Nakamura | |

(Continued)

FOREIGN PATENT DOCUMENTS

DE 34 48 086 C2 8/1985

(Continued)

OTHER PUBLICATIONS

Balasubramaniam et al., An Anti Backlash Two-Part Shaft Coupling with Interlocking Elastically Averaged Teeth, pp. 1-28 [Online]. MIT undated [retrieved on Oct. 2, 2006]. Retrieved from the Internet: <URL:http//pergatory.mit.edu/kinematiccouplings/documents/Papers/elastic_averaging.pdf#search=%22curvic%20coupling%20insert%22>.

*Primary Examiner*—Boyer D Ashley
*Assistant Examiner*—Sara Addisu
(74) *Attorney, Agent, or Firm*—Drinker Biddle & Reath LLP (57) ABSTRACT

A tool holding system has a tool holder including a seat and a clamping device having a clamping end aligned with a surface of the seat, a shim mounted in the seat of the tool holder and including a receiving surface oriented to open toward the clamping end of the clamping device, and a cutting insert mounted in contact with the receiving surface. The cutting insert has a plurality of cutting edges arranged around a periphery of a first face and a plurality of radially oriented features on a mating face in contact with the receiving surface. The receiving surface has corresponding features to that of the mating face of the cutting insert. A radius containing one of the plurality of radially oriented features forms an acute angle, an obtuse angle or a right angle to a radius containing a second of the plurality of radially oriented features.

31 Claims, 8 Drawing Sheets

U.S. PATENT DOCUMENTS

| | | |
|---|---|---|
| 6,736,574 B2 | 5/2004 | Persson et al. |
| 6,948,889 B2 | 9/2005 | Arvidsson |
| 7,001,114 B2 * | 2/2006 | Blucher et al. ............... 407/103 |
| 7,021,871 B2 * | 4/2006 | Arvidsson et al. ........... 407/113 |
| 7,101,122 B2 * | 9/2006 | Horiike et al. ............. 407/113 |
| 2004/0180776 A1 | 9/2004 | Brandt |
| 2007/0009334 A1 | 1/2007 | Edler |
| 2007/0274791 A1 | 11/2007 | Pantzar |
| 2007/0292220 A1 * | 12/2007 | Sjoberg et al. ................ 407/66 |

FOREIGN PATENT DOCUMENTS

| | | |
|---|---|---|
| DE | 42 44 316 A1 | 6/1994 |
| EP | 1 325 785 A1 | 7/2003 |
| EP | 1 415 742 A1 | 5/2004 |
| WO | WO 02/072300 | 9/2000 |
| WO | WO 03/092934 A1 | 11/2003 |
| WO | WO 2007/001224 A1 | 1/2007 |

* cited by examiner

PRIOR ART

TOOLING INSERT WITH MATING SURFACE

FIELD

The present disclosure relates generally to a tool holder. More specifically, the present disclosure relates to a clamped seating arrangement for a cutting insert on a tool holder for, e.g., turning, boring or milling, and also relates to a cutting insert per se.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

In a conventional round turning insert, a rotationally symmetrical clearance surface around a central axis extends between a top side or chip surface and an underside. The basic body shape can be cylindrical, conical or truncated conical. At the transition between the chip surface and the clearance surface there is a cutting edge that is endless and circular. During operation, only a certain part of the cutting edge engages the workpiece, e.g., along an arc. Depending on the diameter of the turning insert and the cutting depth, the arc length in contact with the workpiece varies in length, with a small arc length associated with a smaller cutting depth and a longer arc length associated with a deeper cutting depth.

Figure 1:
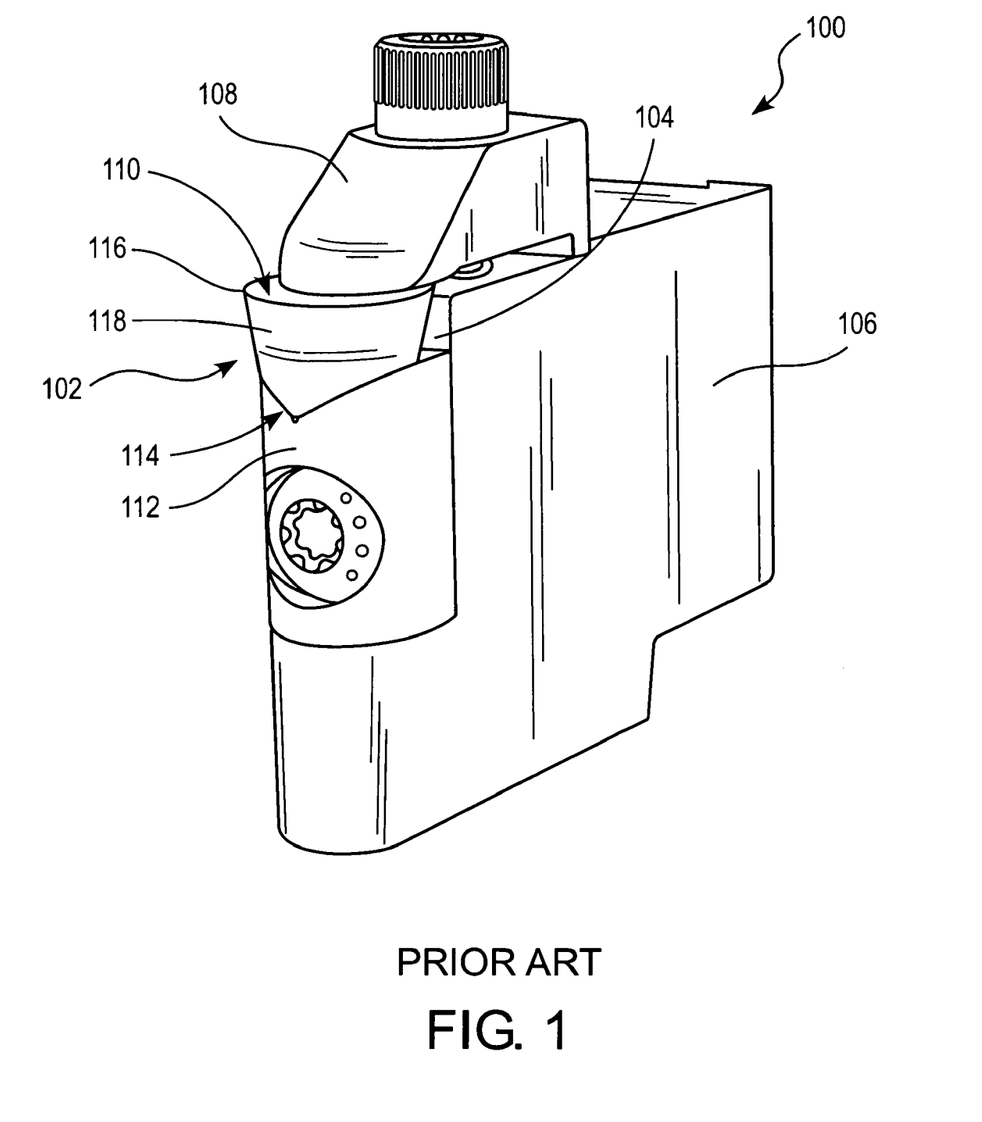
FIG. 1 is a perspective view of a conventional seating arrangement on a cutting tool for cutting inserts and illustrates the V-Bottom design.

Conventional seating arrangements on cutting tools for cutting inserts include a clamp that applies pressure to an insert located in a pocket of the tool holder. FIG. 1 illustrates a conventional seating arrangement 100. An insert 102 is located in a pocket 104 of a tool holder body 106. As shown, the insert 102 is round. The insert 102 is held in place by clamping forces arising from a clamp 108 contacting a top side 110 of the insert 102 and a shim 112 contacting an underside or bottom surface 114 of the insert 102. The shim 112 is generally sacrificial. In the case where the insert 102 fails, the shim 112 will absorb energy and/or itself be broken rather than the tool holder body 106. The top side 110 of the cutting insert is substantially planar and has a cutting edge 116 along the periphery where the top side transitions to the clearance surface 118. The bottom surface 114 is generally v-shaped, which is a complementary shape to the shim surface. The general design shown in FIG. 1 is sometimes referred to as a "V-Bottom" design.

The conventional seating arrangement has several limitations. For example, indexing of inserts in the V-Bottom design is limited to 180 degrees of rotation. Also for example, forces generated during back-facing cutting operations can overcome the clamping forces resulting in the insert pulling out of the tool holder. This event can cause damage to the workpiece or to the machine and possible injury to the machine operator. Further, manufacture of the V-Bottom design is generally by grinding from a larger sized blank, which has attendant waste of material.

SUMMARY

An exemplary embodiment of a cutting insert comprises a cutting edge at an intersection of a first surface and a clearance surface, and a mating surface on a second surface, the mating surface including a plurality of radially oriented features, wherein the first surface is adapted to receive a clamp from a tool holder to seat the mating surface to a receiving surface having a corresponding surface to the mating surface, and wherein a radius containing one of the plurality of radially oriented features forms an acute angle, an obtuse angle or a right angle to a radius containing a second of the plurality of radially oriented features.

An exemplary embodiment of a tool holding system comprises a tool holder including a seat and a clamping device having a clamping end aligned with a surface of the seat, a shim mounted in the seat of the tool holder, the shim including a receiving surface oriented to open toward the clamping end of the clamping device, and a cutting insert mounted in contact with the receiving surface, the cutting insert including a cutting edge arranged around a periphery of a first face, the first face in contact with the clamping end of the clamping device, and a plurality of radially oriented features on a mating face in contact with the receiving surface, wherein the receiving surface has corresponding features to that of the mating face of the cutting insert and wherein a radius containing one of the plurality of radially oriented features forms an acute angle, an obtuse angle or a right angle to a radius containing a second of the plurality of radially oriented features.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 2:
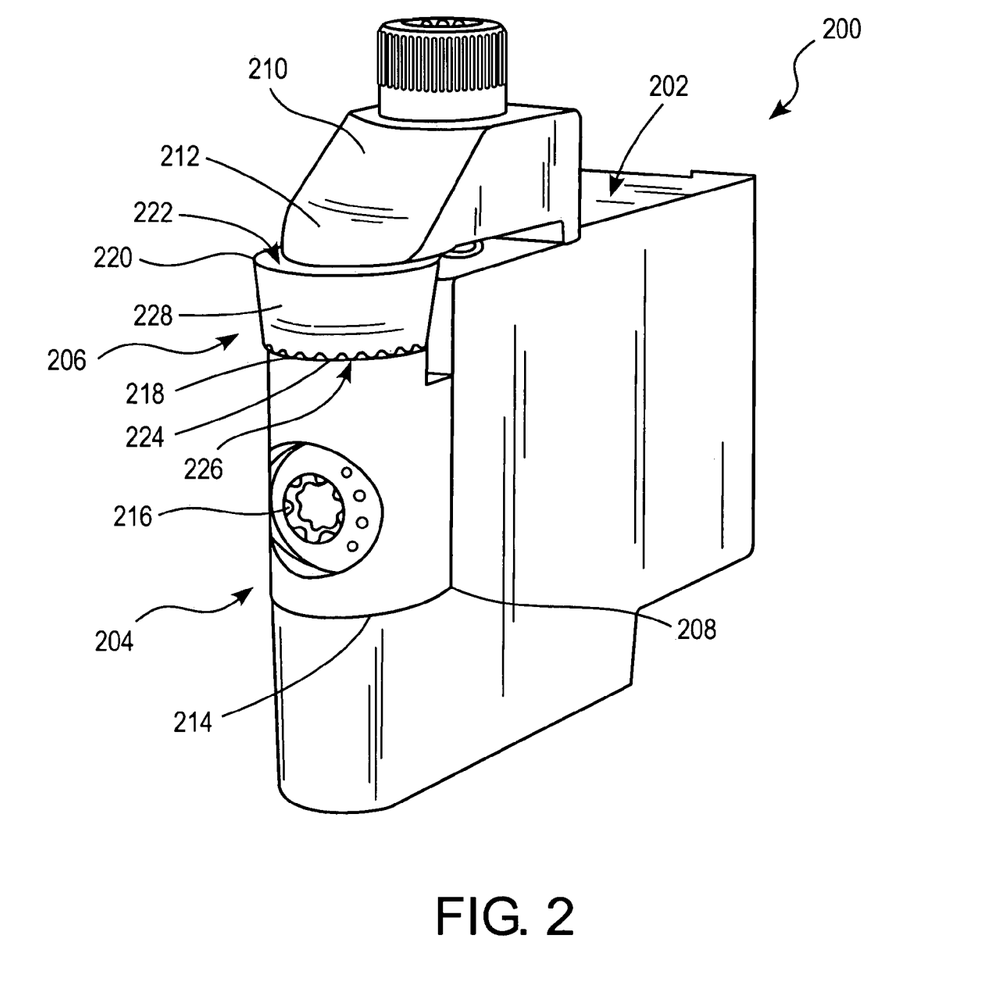
FIG. 2 is a perspective view of an exemplary embodiment of a tool holding system.

FIG. 2 is a perspective view of an exemplary embodiment of a tool holding system 200. In the exemplary embodiment, the tool holding system is shown assembled and includes a tool holder 202, a shim 204, and a cutting insert 206.

The tool holder 202 includes a seat 208 and a clamping device 210 having a clamping end 212 aligned with a surface 214 of the seat 208. The shim 204 is mounted in the seat 208 of the tool holder 202 by a mounting device, such as a set screw 216, and includes a receiving surface 218 oriented to open toward the clamping end 212 of the clamping device 210. The cutting insert 206 is mounted in contact with the receiving surface 218. The cutting insert 206 includes a cutting edge 220 arranged around a periphery of a first face 222 and a plurality of radially oriented features 224 on a mating face 226. A clearance surface 228 joins the first face 222 and the mating face 226. The first face 222 is in contact with the clamping end 212 of the clamping device 210, and the mating face 226 is in contact with the receiving surface 218. The receiving surface 218 has corresponding features to that of the mating face 226 of the cutting insert 206. An optional registration feature between the first face 222 and the clamping end 212 of the clamping device 210 can be included. Examples of registration features include indents, protrusions and the like.

Figure 3:
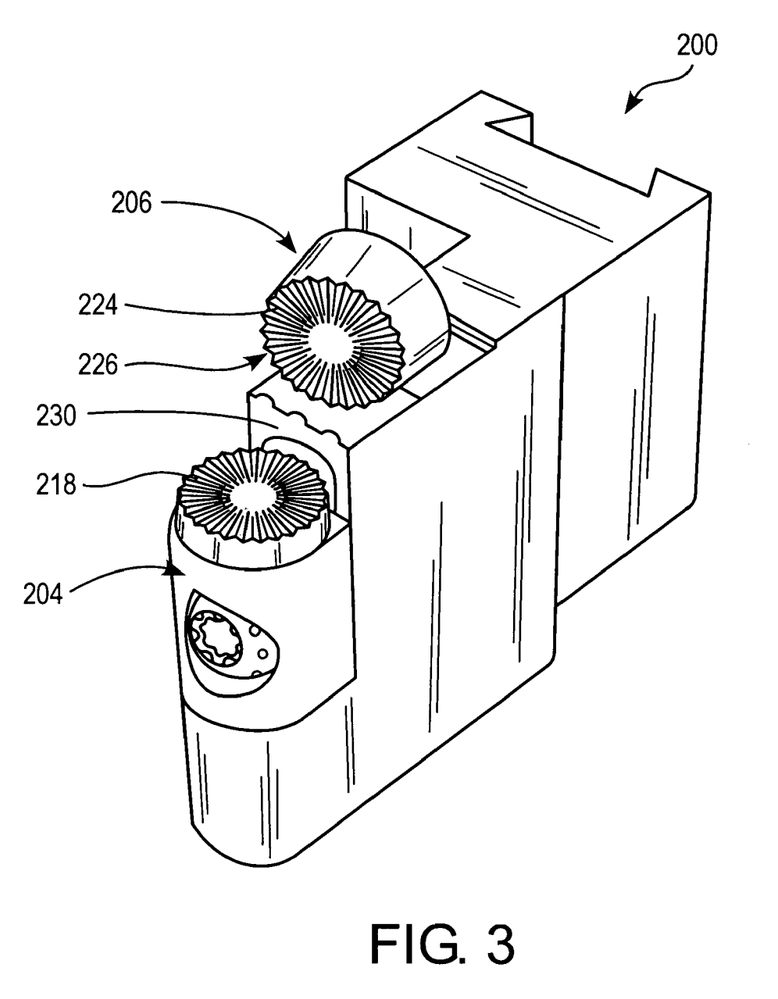
FIG. 3 is an additional perspective view of an exemplary embodiment of the tool holding system shown in FIG. 2 where the tool holding system is shown disassembled.

FIG. 3 is an additional perspective view of an exemplary embodiment of the tool holding system 200 shown in FIG. 2. In the FIG. 3 view, the tool holding system is shown with the clamping device 210 removed and the cutting insert 206 unseated from the receiving surface 218 of the shim 204. Both the plurality of radially oriented features 224 on the mating face 226 and the corresponding features on the receiving surface 218 are shown. In addition, a back seat 230 is shown, which in this embodiment is shown as a curved cut-out region adapted to the curvature of the cutting insert 206. When seated on the receiving surface 218, a portion of the cutting insert 206 is also in contact with the back seat 230.

Figure 4:
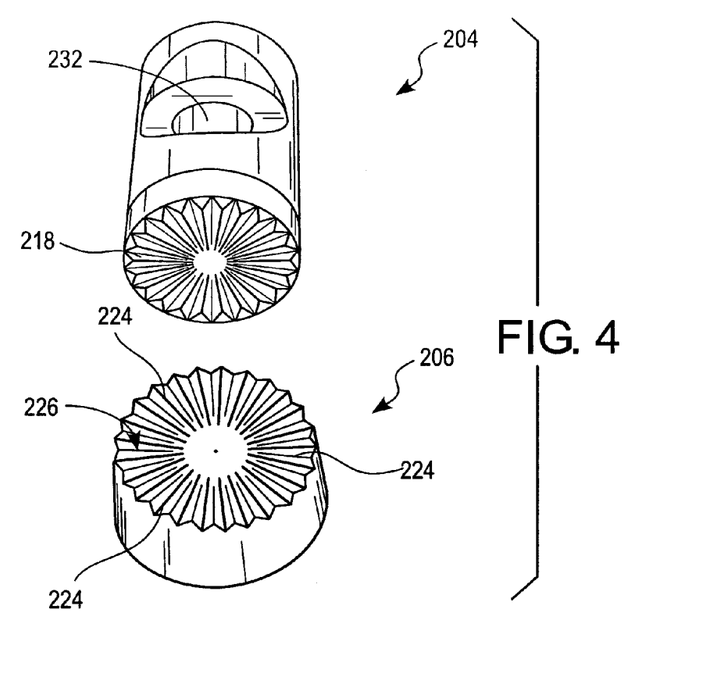
FIG. 4 is a perspective view of an exemplary embodiment of a cutting insert and an exemplary embodiment of a shim.

FIG. 4 is a perspective view of the cutting insert 206 and the shim 204. The shim 204 is shown as a unitary piece having a bore 232 to receive the mounting device, such as set screw 216. The cutting insert 206 is shown with the mating face 226 exposed. The FIG. 4 view clearly shows the correspondence between the plurality of radially oriented features 224 on the mating face 226 and the features on the receiving surface 218 of the shim 206.

Figure 5:
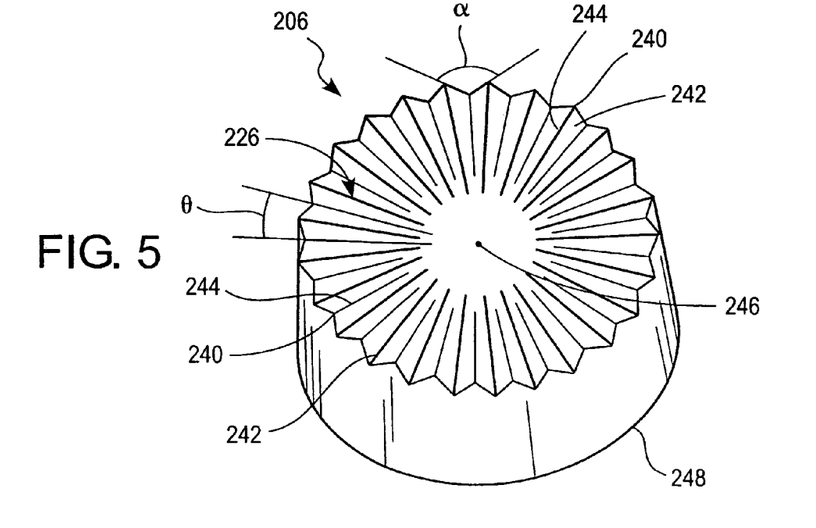
FIG. 5 is a perspective view of an exemplary embodiment of a cutting insert showing an exemplary embodiment of the plurality of radially oriented features on a mating face.
Figure 8:
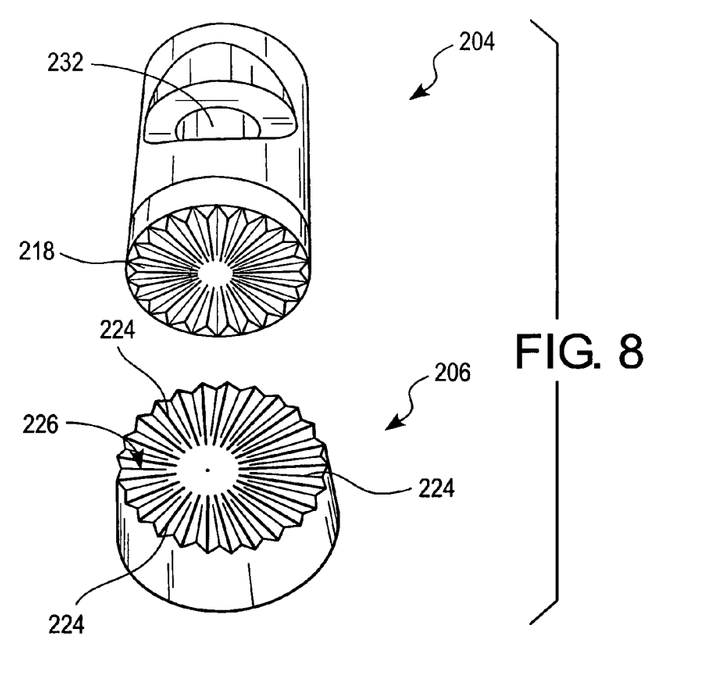
FIGS. 8-10 show another exemplary embodiment of a cutting insert in views similar to those shown in FIGS. 4-5 and 7.
Figure 9:
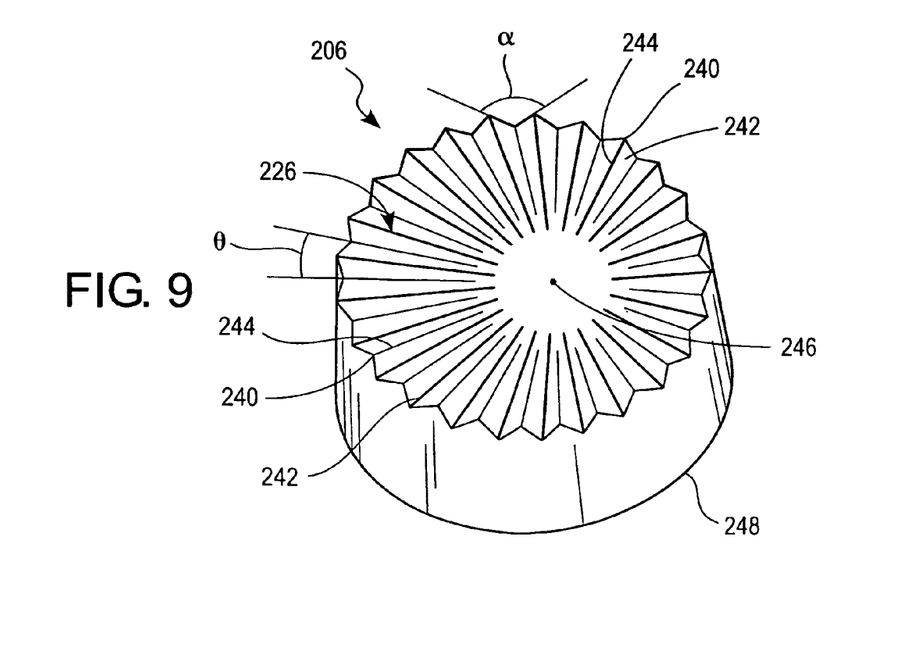
Figure 10:
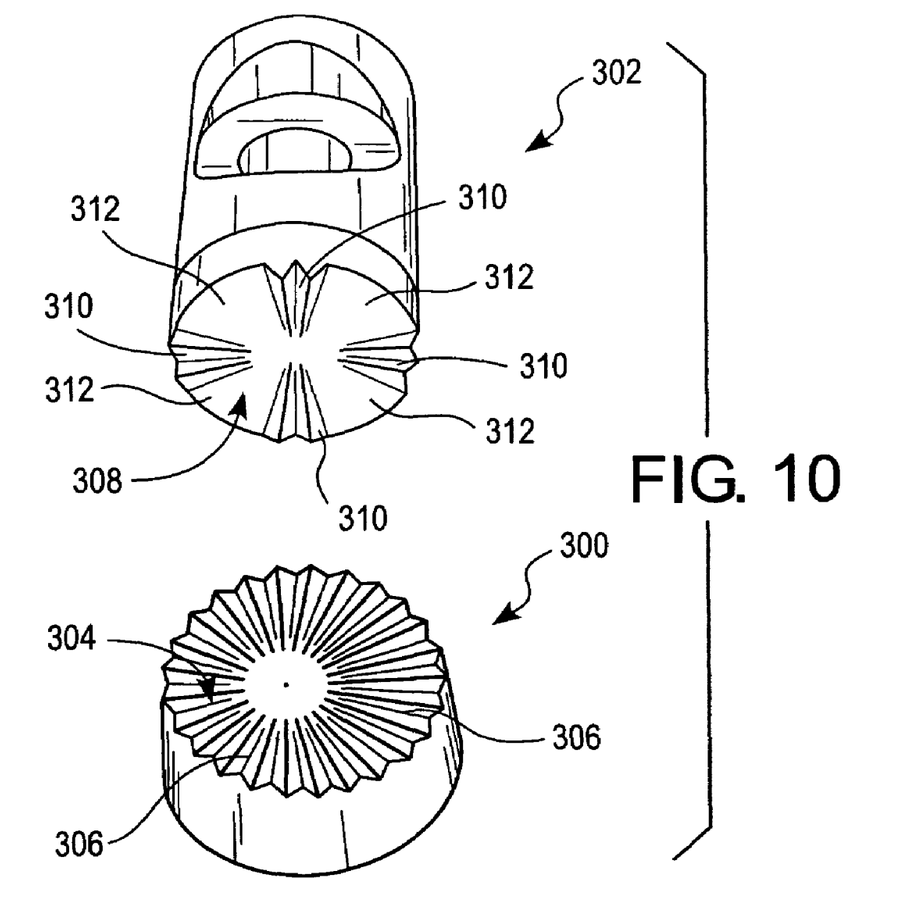

FIG. 5 is a perspective view of an exemplary embodiment of a cutting insert 206 showing an exemplary embodiment of the plurality of radially oriented features 224 on a mating face 226. In this embodiment, the plurality of radially oriented features 224 includes alternating ridges 240 and grooves 242. A ridgeline 244 of each ridge 240 is oriented to intersect at a common point 246. In one exemplary embodiment, the common point 246 is at a radial center axis of the cutting insert 206. However, the common point can be at other locations, including, for example, the common point being off-centered from a radial center axis of the cutting insert, as shown in FIGS. 8-10.

In FIG. 5, the radially oriented features are shown as ridges and grooves. However, other exemplary embodiments of a plurality of radially oriented features 224 on the mating face 226 can be used. For example, such features can include one or more protrusions from the mating surface arranged around a radial center axis of the cutting insert, one or more recesses into the mating surface arranged around a radial center axis of the cutting insert, or a combination of protrusions and recesses.

Figure 6:
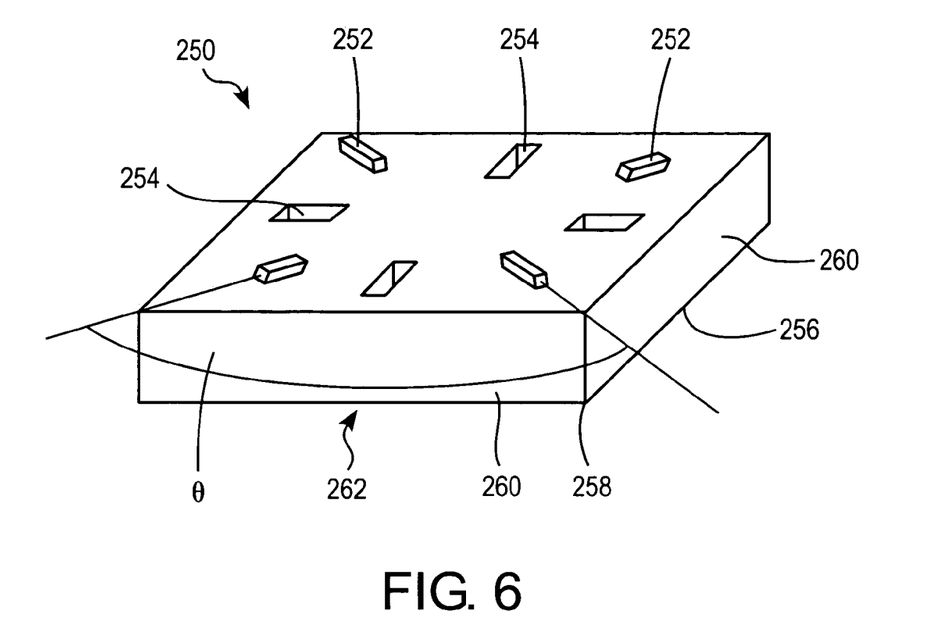
FIG. 6 is a perspective view of an exemplary embodiment of a cutting insert showing a second exemplary embodiment of the plurality of radially oriented features on a mating face.

FIG. 6 is a perspective view of another exemplary embodiment of a cutting insert 250 in which the plurality of radially oriented features on the mating face includes protrusions 252 and recesses 254. The cutting insert in FIG. 6 is a parallelepiped with cutting edges that can be located at the face or at the corner. The shim (not shown in FIG. 6) has a receiving surface with corresponding features to mate with the mating surface features on the insert 250.

The above exemplary embodiments generally apply to cutting inserts that are generally round as well as to cutting inserts that are generally parallelepiped in shape. As such, the cutting insert can take any of several shapes, including circular (shown in FIG. 5) and parallelepiped (shown in FIG. 6).

In an exemplary embodiment, an amount of the plurality of radially oriented features correspond, in number and position, to the desired number of index positions along the cutting edge of a round insert or the number of cutting edges on a non-round or parallelepiped insert. For example and for a cutting edge on a round insert such as shown in FIG. 5, the actual portion of the cutting edge that operates to cut a workpiece is an arc of the periphery as previously described herein. Each arc that operates to cut the workpiece has, on a corresponding portion of the receiving surface, at least one corresponding radially oriented feature. An example of an arc 248 is shown in FIG. 5. When worn from use, the cutting insert can be indexed to place a different arc in the cutting position by moving, or rotating, the cutting insert to place the radially oriented feature on the mating face into a different feature on the receiving surface. In another example and for cutting edges arranged on a parallelepiped cutting insert such as shown in FIG. 6, the actual portion of the cutting edge that operates to cut a workpiece is edge 256 or a corner 258 where the clearance surface 260 meets the top surface 262. Each cutting edge that operates to cut the workpiece has a corresponding radially oriented feature. When worn from use, the cutting insert can be indexed to place a different cutting edge in the cutting position by moving, or rotating, the cutting insert to place the radially oriented feature in a different feature on the mating face. In FIG. 6, the radially oriented features are shown as squared geometric protrusions 252 or recesses 254. However, curved and rounded geometries, both regular and irregular, can also be used, such as spherical, hemispherical or other curved or rounded geometries.

The amount of movement or rotation of the cutting insert when indexed can vary. For example, the plurality of radially oriented features can include at least three radially oriented features. A radius containing one of the plurality of radially oriented features forms an acute angle or an obtuse angle to a radius containing a second of the plurality of radially oriented features. Here, an acute angle means an angle measuring between 0 and 90 degrees, an obtuse angle means an angle measuring between 90 and 180 degrees and a right angle means an angle measuring 90 degrees. Further, both circular cutting inserts and regular and irregular parallelepipeds have a radius, which is a line segment that joins a center of the cutting insert with a point on the circumference of the cutting insert, such as at a periphery of an edge or a face.

In another example, the plurality of radially oriented features can include from 3 to 36 radially oriented features. Other examples include four features, five features, six features, seven features, eight features, nine features, ten features, and so forth.

The position of the plurality of radially oriented features can vary. For example, successive radially oriented features can have an angular separation (θ) of between 10 degrees and 170 degrees, alternatively 12 degrees to 120 degrees, alternatively 15 degrees to 120 degrees, alternatively 30 degrees to 90 degrees, alternatively about 60 degrees. The angular separation is measured between two sequential same features— for example for ridge and groove arrangement, the angular separation is measured between ridgelines or between groovelines; for example for protrusions and recesses, the angular separation is measured between protrusions or between recesses.

Further and for embodiments using a ridge and groove system, the included angle (α) forming the groove varies by the number and angular separation of the radially oriented features. An example of the included angle is from about 30 to about 120 degrees, alternatively from about 60 to about 120 degrees, alternatively about 90 degrees.

The height of a ridge, as measured from the groove can vary. Further the height can vary radially along the same ridge and groove. An example of a height of the ridge relative to the groove, as measured at an edge of the mating face is about 0.5 mm. For a radially varying height, the height can go to zero as the radial distance goes toward the center axis at the common point. In the exemplary embodiments illustrated in FIGS. 2-5, the configuration of the mating face 226 of the cutting insert as well as the configuration of the receiving surface 218 of the shim are generally planar. More specifically, the ridgelines 244 of the ridges 240 are located substantially in the same plane. Also, the plane of the ridgelines is substantially parallel with the first face 222 of the cutting insert. However, other exemplary embodiments can arrange the ridgelines, such that they together substantially form a cone or an inverted cone, with the intersection at the common point 246 constituting the tip of the cone. The receiving surface 216 is in the inverse form from the mating face 226 in order to receive the mating face 226

The ridge and groove system can be formed by, for example, grinding the cutting insert. The number of features and their angular separation determine the number of indexes on the cutting insert and the separation of the index positions.

In exemplary embodiments, there is complete registration, e.g., fit and correspondence of number of radially oriented features, between the plurality of radially oriented features on the mating surface and the corresponding features on the receiving surface. As such, each of the plurality of radially oriented features on the mating surface is seated in a corresponding feature on the receiving surface at each indexing position of the cutting insert. However, the degree of registration can be less than 100%. For example, the number of corresponding features on the receiving surface can be less than the number of radially oriented features on the mating surface.

Figure 7:
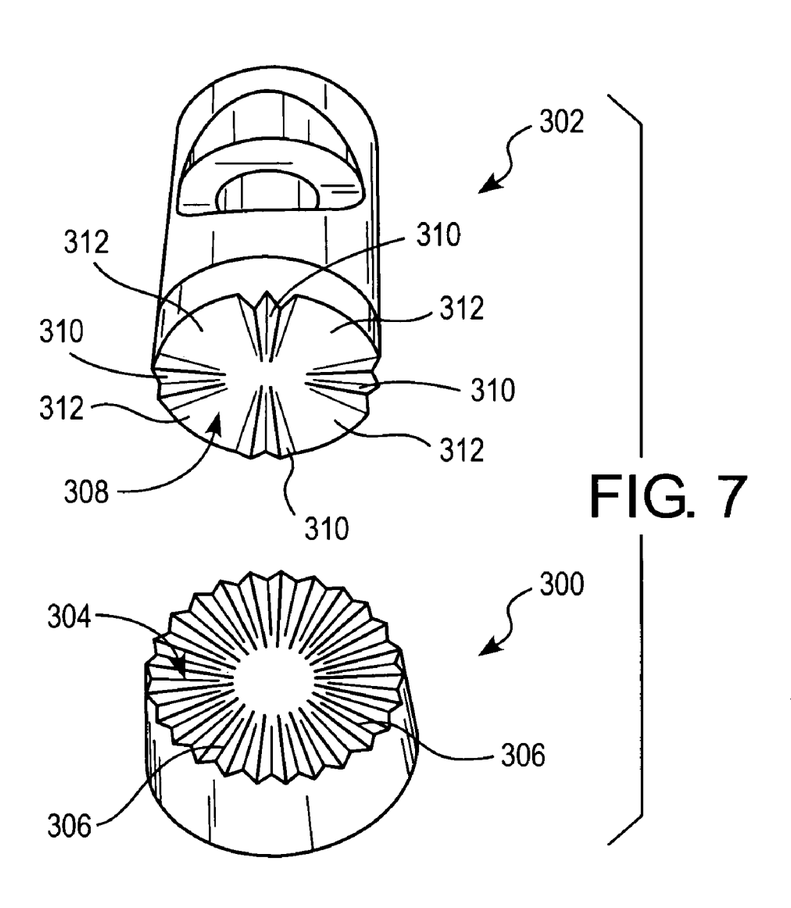
FIG. 7 is a perspective view of another exemplary embodiment of a cutting insert and another exemplary embodiment of a shim.

FIG. 7, is a perspective view of an exemplary embodiment of a cutting insert 300 and a shim 302 where there is less than 100% registration. The cutting insert 300 is shown with the mating face 304 exposed. The mating face 304 is substantially the same as that described herein for other embodiments of the cutting insert and includes a plurality of radially oriented features 306 on the mating face 304. The shim 302 is shown with a view of the receiving surface 308.

The FIG. 7 view clearly shows a correspondence between the plurality of radially oriented features 306 on the mating face 304 and the features on the receiving surface 306 of the shim 302 and also shows that, when positioned together, less than all of the plurality of radially oriented features 306 on the mating face 304 are in contact with corresponding feature 310 on the receiving surface 308. Here, the mating face 304 has a continuum of radially oriented features and the receiving surface 308 has distinctly and spatially separated corresponding features. Any number of radially oriented features and corresponding features can be used. However, the position of the corresponding features on the receiving surface coincides with at least a portion of the radially oriented features on the mating face so that indexing of the insert can still be accomplished. Further, a land region 312 on the receiving surface 308 separates the distinct and spatially separated corresponding features on the receiving surface 308. The land region 312 is absent features that would serve to position or mate with the plurality of radially oriented features 306 on the mating face 304. In additional embodiments, the land region can be provided on the cutting insert.

In some embodiments, not all features on the mating face have corresponding features on the receiving surface, this allows more universality to the shim for various number of radially oriented features on the insert. For example, an insert having a number of radially oriented features can have a subset of those features engaged by the corresponding features on the receiving surface. An insert, regardless of shape, design or number of radially oriented features can be accommodated by the receiving surface if the receiving surface has a subset of corresponding features that at least correspond in some positions to features on the mating face to allow registration and indexing. As an example, the receiving surface shown in FIG. 7 showing four locations for corresponding features can be in registration with a mating face having radially oriented features that, at a minimum, engage at least two of the four locations. However, the higher the degree of registration, the stronger is the coupling between the plurality of radially oriented features on the mating surface and the corresponding features on the receiving surface, which contributes to improved cutting insert and cutting tool performance, for example, by minimizing the instances of pull out during back-facing operations.

In exemplary embodiments, the cutting insert is monolithic meaning that there is no through-opening in the insert. Thus, the insert is seated by clamping forces and/or forces arising from the engagement of features on the mating face and the receiving surface. Further, stronger coupling is achieved without any secondary attachment device, such as a screw through the body of the insert or the like. The plurality of radially oriented features and the registration between the mating surface and the receiving surface also helps to minimize pull out during back-facing cutting operations and provides more accurate indexing, thus providing more uniquely accessible cutting edges. The shape of the cutting insert, by eliminating the V-Bottom design, conserves material and is easier to manufacture. The plurality of radially oriented features advantageously provide self-centering of the cutting insert on the receiving surface.

In exemplary embodiments, the cutting insert can be made of cemented carbide, cermets, ceramics, superhard materials or high speed steel or any other material suitable for chip forming machining of metals or composite materials know in the art. Examples of ceramics include ceramics based on oxides, nitrides, or mixtures thereof and may contain whiskers. Examples of superhard materials include cubic boron nitride (CBN) or polycrystalline diamond (PCD), alone or attached to cemented carbide or cermet. In addition, the inserts can be coated or uncoated.

In exemplary embodiments, the cutting insert can be used for turning, milling, drilling, grooving, parting operations or any other method for chipforming machining of metals known in the art.

In exemplary embodiments, the unitary piece of the shim can be, for example, hardened steel or cemented carbide. The use of a cutting insert that is harder than the material of the receiving surface of the shim allows the receiving surface of the shim to match the profile of the plurality of radially oriented features on the mating surface over time, a process called "burnneling". The shim can be of various sizes, shapes and orientations to allow retrofitting of the disclosed cutting insert and tool holder system into existing tool holder bodies.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutting insert, comprising:
   one or more cutting edges at an intersection of a first surface and a clearance surface; and
   a mating surface on a second surface, the mating surface including a plurality of radially oriented features,
   wherein the first surface is adapted to receive a clamp from a tool holder to seat the mating surface to a receiving surface having a corresponding surface to the mating surface,
   wherein a radius containing one of the plurality of radially oriented features forms an acute angle, an obtuse angle or a right angle to a radius containing a second of the plurality of radially oriented features,
   wherein the cutting insert is monolithic,
   wherein the plurality of radially oriented features includes at least two adjacent ridges including V-shaped peaks separated by a groove including a V-shaped base, and
   wherein the plurality of radially oriented features includes alternating ridges and grooves, wherein a ridgeline of each ridge is oriented to intersect at a common point.

2. The cutting insert of claim 1, wherein the common point is at a radial center axis of the cutting insert.

3. The cutting insert of claim 1, wherein the common point is off-centered from a radial center axis of the cutting insert.

4. The cutting insert according to claims 2 or 3, wherein an amount of the plurality of radially oriented features correspond in number and position to the cutting edges at the intersection of the first surface and the clearance surface.

5. The cutting insert claim 2, wherein the plurality of radially oriented features includes at least three radially oriented features.

6. The cutting insert of claim 5, wherein the plurality of radially oriented features includes from 3 to 36 radially oriented features.

7. The cutting insert of claim 2, wherein the height or depth of the radially oriented features varies to zero as the radial distance nears the common point.

8. The cutting insert of claim 2, wherein the area surrounding the common point is a land region absent features that serve to position or mate the cutting insert to the mating surface.

9. The cutting insert of claim 3, wherein the height or depth of the radially oriented features varies to zero as the radial distance nears the common point.

10. The cutting insert of claim 3, wherein the area surrounding the common point is a land region absent features that serve to position or mate the cutting insert to the mating surface.

11. The cutting insert claim 3, wherein the plurality of radially oriented features includes at least three radially oriented features.

12. The cutting insert of claim 11, wherein the plurality of radially oriented features includes from 3 to 36 radially oriented features.

13. The cutting insert of claim 1, wherein the cutting insert is not parallelepiped.

14. A tool holding system, comprising:
    a tool holder including a seat and a clamping device having a clamping end aligned with a surface of the seat;
    a shim mounted in the seat of the tool holder, the shim including a receiving surface oriented to open toward the clamping end of the clamping device; and
    a monolithic cutting insert mounted in contact with the receiving surface, the cutting insert including one or more cutting edges at an intersection of a first face and a clearance surface, the first face in contact with the clamping end of the clamping device, and a plurality of radially oriented features on a mating face in contact with the receiving surface, wherein the receiving surface has corresponding features to that of the mating face of the cutting insert and wherein a radius containing one of the plurality of radially oriented features forms an acute angle, an obtuse angle or a right angle to a radius containing a second of the plurality of radially oriented features,
    wherein the plurality of radially oriented features includes at least two adjacent ridges including V-shaped peaks separated by a groove including a V-shaped base, and
    wherein the plurality of radially oriented features includes alternating ridges and grooves, wherein a ridgeline of each ridge is oriented to intersect at a common point.

15. The tool holding system of claim 14, wherein the common point is at a radial center axis of the cutting insert.

16. The tool holding system of claim 14, wherein the common point is off-centered from a radial center axis of the cutting insert.

17. The tool holding system according to claims 15 or 16, wherein an amount of the plurality of radially oriented features correspond in number and position to the cutting edges on the periphery of the first surface.

18. The tool holding system claim 15 wherein the plurality of radially oriented features includes at least three radially oriented features.

19. The tool holding system of claim 18, wherein the plurality of radially oriented features includes from 3 to 36 radially oriented features.

20. The tool holding system of claim 15, wherein all of the plurality of radially oriented features on the mating face are in registration with corresponding features on the receiving surface.

21. The tool holding system of claim 15, wherein less than all of the plurality of radially oriented features on the mating face are in registration with corresponding features on the receiving surface.

22. The tool holding system of claim 15, wherein the height or depth of the radially oriented features varies to zero as the radial distance nears the common point.

23. The tool holding system of claim 15, wherein the area surrounding the common point is a land region absent features that serve to position or mate the cutting insert to the mating surface.

24. The tool holding system according to claims 15 or 16, wherein at least a portion of the corresponding features on the receiving surface are separated from each other by a land region.

25. The tool holding system of claim 16, wherein the height or depth of the radially oriented features varies to zero as the radial distance nears the common point.

26. The tool holding system of claim 16, wherein the area surrounding the common point is a land region absent features that serve to position or mate the cutting insert to the mating surface.

27. The tool holding system claim 16, wherein the plurality of radially oriented features includes at least three radially oriented features.

28. The tool holding system of claim 27, wherein the plurality of radially oriented features includes from 3 to 36 radially oriented features.

29. The tool holding system of claim 16, wherein all of the plurality of radially oriented features on the mating face are in registration with corresponding features on the receiving surface.

30. The tool holding system of claim 16, wherein less than all of the plurality of radially oriented features on the mating face are in registration with corresponding features on the receiving surface.

31. The tool holding system of claim 14, wherein the cutting insert is not parallelepiped.

* * * * *